US010149332B2

(12) United States Patent
Ramkull (10) Patent No.: US 10,149,332 B2
(45) Date of Patent: Dec. 4, 2018

(54) RADIO RESOURCE CONTROL CONNECTION ESTABLISHMENT (71) Applicant: Telefonaktiebolaget LM Ericsson (publ), Stockholm (SE)

(72) Inventor: Joachim Ramkull, Lund (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 15/109,641

(22) PCT Filed: Mar. 10, 2016

(86) PCT No.: PCT/EP2016/055170
§ 371 (c)(1),
(2) Date: Jul. 3, 2016

(87) PCT Pub. No.: WO2017/152984
PCT Pub. Date: Sep. 14, 2017

(65) Prior Publication Data
US 2018/0199385 A1 Jul. 12, 2018

(51) Int. Cl.
H04W 76/10 (2018.01)
H04W 36/00 (2009.01)
(Continued)

(52) U.S. Cl.
CPC ....... H04W 76/10 (2018.02); H04W 36/0094 (2013.01); H04W 36/08 (2013.01); H04W 36/24 (2013.01); H04W 36/36 (2013.01)

(58) Field of Classification Search
None
See application file for complete search history.

(56) References Cited

U.S. PATENT DOCUMENTS 8,112,087 B2 * 2/2012 Jeong .................. H04W 76/10
455/436
2007/0070938 A1 3/2007 Hori et al.
(Continued)

FOREIGN PATENT DOCUMENTS

EP 1845749 A2 10/2007
EP 2846599 A1 3/2015
(Continued)

OTHER PUBLICATIONS

3GPP TS 25.304 V13.0.0 (Dec. 2015), 3rd Generation Partnership Project; Technical Specification Group Radio Access Network; User Equipment (UE) procedures in idle mode and procedures for cell reselection in connected mode (Release 13), 58 pages.
(Continued)

Primary Examiner — Ayanah George
(74) Attorney, Agent, or Firm — Leffler Intellectual Property Law, PLLC (57) ABSTRACT A wireless communication device intends to request an RRC connection to initiate a voice call, initiate a data session or respond to paging. The wireless communication device considers the maximum response time for the connection setup indicated by a serving cell and compare to the maximum response (i.e. waiting) time for the connection setup indicated by a neighbour cell. A long maximum response time may indicate a cell with high load. If the maximum response time indicated by a neighbour cell is significantly lower, the wireless communication device may either reselect and request RRC connection from this neighbour cell instead or reduce the time to wait for a response from the serving cell and reselect to the neighbour cell if there is no response from the serving cell within the reduced time.

23 Claims, 4 Drawing Sheets (51) Int. Cl.
*H04W 36/36* (2009.01)
*H04W 36/24* (2009.01)
*H04W 36/08* (2009.01)

(56) References Cited

U.S. PATENT DOCUMENTS

| | | |
|---|---|---|
| 2014/0045509 A1 | 2/2014 | Parr |
| 2016/0014681 A1* | 1/2016 | Yi ........................ H04W 48/16 455/422.1 |
| 2016/0070938 A1* | 3/2016 | Matsushima ........... G06F 21/14 713/176 |

FOREIGN PATENT DOCUMENTS

| | | |
|---|---|---|
| EP | 2892281 A1 | 7/2015 |
| WO | 2013062583 A1 | 5/2013 |
| WO | 2014035885 A1 | 3/2014 |
| WO | 2014056781 A1 | 4/2014 |
| WO | 2014070100 A1 | 5/2014 |

OTHER PUBLICATIONS

3GPP TS 25.331 V13.1.0 (Dec. 2015), 3rd Generation Partnership Project; Technical Specification Group Radio Access Network; Radio Resource Control (RRC); Protocol specification (Release 13), Table of Contents (pp. 1-39).
3GPP TS 25.331 V13.1.0 (Dec. 2015), 3rd Generation Partnership Project; Technical Specification Group Radio Access Network; Radio Resource Control (RRC); Protocol specification (Release 13), Section 8.1.3, 59 pages.
3GPP TS 36.304 V13.0.0 (Dec. 2015), 3rd Generation Partnership Project; Technical Specification Group Radio Access Network; Evolved Universal Terrestrial Radio Access (E-UTRA); User Equipment (UE) procedures in idle mode (Release 13), Table of Contents (pp. 1-4).
3GPP TS 36.304 V13.0.0 (Dec. 2015), 3rd Generation Partnership Project; Technical Specification Group Radio Access Network; Evolved Universal Terrestrial Radio Access (E-UTRA); User Equipment (UE) procedures in idle mode (Release 13), Section 5.2, 18 pages.
3GPP TS 36.331 V13.0.0 (Dec. 2015), 3rd Generation Partnership Project; Technical Specification Group Radio Access Network; Evolved Universal Terrestrial Radio Access (E-UTRA); Radio Resource Control (RRC); Protocol specification (Release 13), Table of Contents (pp. 1-15).
3GPP TS 36.331 V13.0.0 (Dec. 2015), 3rd Generation Partnership Project; Technical Specification Group Radio Access Network; Evolved Universal Terrestrial Radio Access (E-UTRA); Radio Resource Control (RRC); Protocol specification (Release 13), Section 5.3.3, 28 pages.
PCT International Search Report, dated Nov. 14, 2016, in connection with International Application No. PCT/EP2016/055170, all pages.
PCT Written Opinion, dated Nov. 14, 2016, in connection with International Application No. PCT/EP2016/055170, all pages.
3GPP TS 36.304 V13.0.0, Dec. 2015, 3rd Generation Partnership Project; Technical Specification Group Radio Access Network; Evolved Universal Terrestrial Radio Access (E-UTRA); User Equipment (UE) procedures in idle mode, Release 13, pp. 1-42.

* cited by examiner

RADIO RESOURCE CONTROL CONNECTION ESTABLISHMENT

TECHNICAL FIELD

The present disclosure relates to controlling setup of an RRC connection in a cellular wireless communication system.

BACKGROUND

Embodiments herein relate to connection establishment in a cellular wireless communication system that operates according to a $3^{rd}$ generation partnership project (3GPP) specification, such as universal mobile telecommunications system (UMTS), long term evolution (LTE) and other radio access technologies wherein connection establishment is handled in a similar manner as in UMTS and LTE. When a wireless communication device (often denoted user equipment or UE) intends to initiate a voice call, initiate a data session or respond to a paging transmission, an early step is to request a radio resource control (RRC) connection. The normal procedure, e.g. as described in 3GPP technical specifications TS 36.331: 5.3.3 and TS 25.331: 8.1.3, is to make this request towards the radio base station of the cell the wireless communication device is currently camping on (i.e. tuned to a control channel of the cell). This is performed by transmitting an RRCConnectionRequest message to the radio base station that provides the control channel of the cell.

After having sent the RRCConnectionRequest, the wireless communication device awaits a response. The response from a radio base station may be an RRCConnectionSetup message that has an effect that the wireless communication device is granted an RRC connection and should use configuration information that is comprised in the RRCConnectionSetup message. The response from the radio base station may alternatively be an RRCConnectionReject message that has an effect that the wireless communication device is not granted an RRC connection. Depending on e.g. the load of the cell, the time for the wireless communication device to wait for the response from the cell (i.e. the radio base station) may vary. The cell indicates the maximum time to wait for a response by transmitting this information in system information broadcasted, in system information blocks (SIB) from the cell.

As can be readily appreciated, the response time will impact the user experience when initiating a connection. For example, the user will experience a delay when the response time is significant, e.g. for LTE the maximum response time can be up to 2 seconds and for wideband code division multiple access (WCDMA) radio access (used in UMTS) the maximum time is even longer-up to 8 seconds. With the increasing number of connected wireless communication devices in $2^{nd}$, $3^{rd}$ and $4^{th}$ generation (2G, 3G and 4G) 3GPP systems and anticipated huge increase in number of connected devices when $5^{th}$ generation (5G) 3GPP systems are implemented, there is a high probability of long response times. Consequently, there is a gain in reducing the delay when a wireless communication device is initiating a network connection.

A problem with existing solutions is that the wireless communication device will normally request an RRC connection towards the cell on which the wireless communication device is camped on (denoted current or serving cell), without considering the maximum time the wireless communication device may have to wait for a response. If the maximum time to wait for a response is high for the current cell and significantly lower for a neighbour cell with sufficient signal quality of same or different frequency or radio access technology (RAT), there may be a significant loss, in terms of increased delay for the connection setup.

SUMMARY

An object of the present disclosure is to overcome at least some of the drawbacks with prior art relating to delays associated with RRC connection setup.

This is achieved, in a first aspect, by a method performed by a wireless communication device for controlling setup of a radio resource control, RRC, connection in a cellular wireless network. The wireless communication device is associated with a serving cell. The method comprises obtaining a first timer value, $T_1$, and a second timer value, $T_2$. These timer values specify a respective maximum time for waiting for an RRC connection setup message from the serving cell and a maximum time for waiting for an RRC connection setup message from a neighbour cell. A timer value difference, $DT_{12}$, is then calculated by subtracting the second timer value from the first timer value. If the timer value difference is greater than a first threshold value, $TH_1$, a reselection is made of the neighbour cell as serving cell, and an RRC connection request message is transmitted in the serving cell.

In some embodiments, an estimation is made of a reselection time, $T_{RES}$. This reselection time corresponds to a time period needed for executing the reselection. The reselection and transmitting are then performed if the estimated reselection time is less than a second threshold value, $TH_2$. In some of these embodiments, the second threshold value is equal to the timer value difference, $DT_{12}$.

In some embodiments, an estimate is made of a type of service provided by the neighbour cell, and wherein said reselection and transmitting are performed if this estimated type of service is satisfactory.

In some embodiments, if no response to the transmitted RRC connection request message is received within a time period corresponding to the second timer value, then the method is repeated from the obtaining of the first and second timer values.

The object of the present disclosure is also achieved, in a second aspect, by a method performed by a wireless communication device for controlling setup of a radio resource control, RRC, connection in a cellular wireless network. The wireless communication device is associated with a serving cell. The method comprises obtaining a first timer value, $T_1$, and a second timer value, $T_2$. These timer values specify a respective maximum time for waiting for an RRC connection setup message from the serving cell and a maximum time for waiting for an RRC connection setup message from a neighbour cell. A timer value difference, $DT_{12}$, is then calculated by subtracting the second timer value from the first timer value. If the timer value difference is greater than a first threshold value, $TH_1$, the first timer value is set by subtracting a timer reduction value, $TR_1$, from the first timer value, and an RRC connection request message is transmitted in the serving cell. The timer reduction value, $TR_1$, may for example be equal to the timer value difference, DT12.

In some embodiments of the method of this other aspect, if no response to the transmitted RRC connection request message is received within a time period corresponding to the first timer value, then a reselection of the neighbour cell as serving cell is made, and an RRC connection request message is transmitted in the serving cell.

Embodiments of all aspects include those wherein the obtaining of any of the first timer value and the second timer value comprises receiving information contained in a system information block, SIB, transmitted in the cellular wireless network.

Also, embodiments of all aspects include those wherein the obtaining of any of the first timer value and the second timer value comprises receiving information contained in a data block transmitted during a data connection in the cellular wireless network. Any of the first and second timer values received in information contained in a data block transmitted during a data connection may, in these embodiments, have a value that is lower than a corresponding timer value received in information contained in a SIB.

In other words, in these aspects and embodiments, when a wireless communication device intends to request an RRC connection to initiate a voice call, initiate a data session or respond to paging, the wireless communication device takes into consideration the maximum response time for the connection setup indicated by the serving cell and compare to the maximum response (i.e. waiting) time for the connection setup indicated by a neighbour cell. A long maximum response time may indicate a cell with high load. If the maximum response time indicated by a neighbour cell is significantly lower (optionally, also providing a type of service that is satisfactory), the wireless communication device may either reselect and request RRC connection from this neighbour cell instead or reduce the time to wait for a response from the serving cell and reselect to the neighbour cell if there is no response from the serving cell within the reduced time. This may reduce the delay for the RRC connection setup. There may also be a reduction in the delay for execution of the requested service if a cell is not in a high load condition which is more likely to be the case in a cell indicating a high maximum time for the response to an RRC connection request.

In addition to a situation where the wireless communication device is about to initiate a voice call, a data session etc. as discussed above, a wireless communication device may, also at regular cell reselection, consider maximum time for response to an RRC connection request message when selecting a network, i.e. selecting a radio access technology (RAT), and cell.

In another aspect, there is provided a wireless communication device for controlling setup of a radio resource control, RRC, connection in a cellular wireless network. The wireless communication device comprises input/output circuitry, a processor and a memory. The memory contains instructions executable by said processor whereby the wireless communication device is operative to be associated with a serving cell and operative to:
  obtain a first timer value, T1, that specifies a maximum time for waiting for an RRC connection setup message from the serving cell and a second timer value, T2, that specifies a maximum time for waiting for an RRC connection setup message from a neighbour cell,
  calculate a timer value difference, DT12, by subtracting the second timer value from the first timer value,
  if the timer value difference is greater than a first threshold value, TH1:
    reselect the neighbour cell as serving cell, and
    transmit an RRC connection request message in the serving cell.

In yet another aspect, there is provided a wireless communication device for controlling setup of a radio resource control, RRC, connection in a cellular wireless network. The wireless communication device comprises input/output circuitry, a processor and a memory. The memory contains instructions executable by said processor whereby the wireless communication device is operative to be associated with a serving cell and operative to:
  obtain a first timer value, T1, that specifies a maximum time for waiting for an RRC connection setup message from the serving cell and a second timer value, T2, that specifies a maximum time for waiting for an RRC connection setup message from a neighbour cell,
  calculate a timer value difference, DT12, by subtracting the second timer value from the first timer value,
  if the timer value difference is greater than a first threshold value, TH1:
    set the first timer value by subtracting a timer reduction value, TR1, from the first timer value, and
    transmit an RRC connection request message in the serving cell.

Embodiments of the wireless communication device that correspond to the various method embodiments summarized above are also provided.

In yet another aspect there is provided a computer program, comprising instructions which, when executed on at least one processor in a network node, cause the network node to carry out the methods as summarized above in connection with the first aspect and the various embodiments of this aspect.

In another aspect there is provided a carrier comprising a computer program according to the summarized aspect above, wherein the carrier is one of an electronic signal, an optical signal, a radio signal and a computer readable storage medium.

These other aspects provide the same effects and advantages as summarized above in connection with the methods of the first and second aspects.

BRIEF DESCRIPTION OF THE DRAWINGS

FIGS. 3a and 3b are flowcharts,
FIGS. 4a and 4b schematically illustrate wireless communication devices, and
FIGS. 5a and 5b schematically illustrate wireless communication devices.

DETAILED DESCRIPTION

Figure 1:
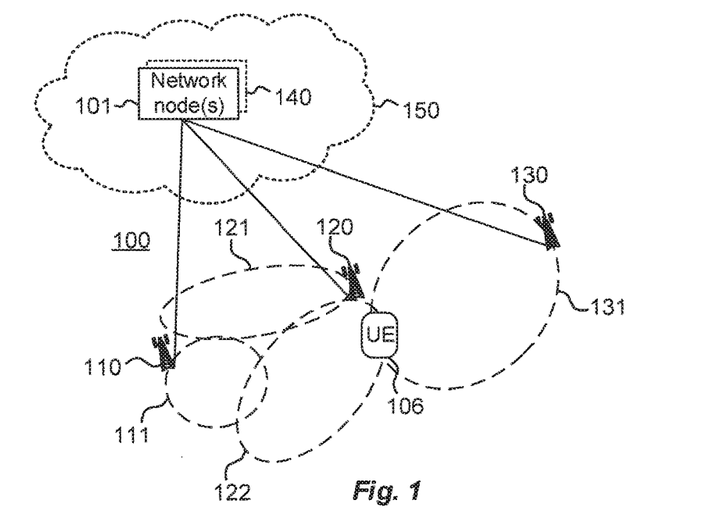
FIG. 1 schematically illustrates a cellular wireless network.

In FIG. 1, a cellular wireless network 100 comprises radio base stations 110, 120, 130 that operate according to 3GPP specifications such as GSM, UMTS and LTE. As such the radio base stations 110, 120, 130 may be in the form of NodeB, evolved NodeB etc, as the skilled person will realize. In their normal operation, the radio base stations 110, 120, 130 are in connection with a network 150 of nodes 101, 140 that also operate according to 3GPP specifications such as GSM, UMTS and LTE. Combined operation of the radio base stations 110, 120, 130 and the nodes 101, 140 maintains respective one or more radio cells 111, 121, 122, 131. A wireless communication device 106 may communicate in these cells 111, 121, 122, 131 as described in this disclosure, for example following 3GPP specifications including GSM, UMTS and LTE. The network 150 of nodes 101, 140 may comprise individual physical nodes in the form of core network nodes such as various gateway nodes and mobility management nodes.

The entities comprised in the wireless network 100 may also be configured such that, e.g., most of the functionality of the radio base stations 110, 120, 130 is comprised in the network nodes 101, 140. In such an example, the entities 110, 120, 130 may be considered as mere antenna stations (antenna nodes) with little or no signal processing capability and most or all of the NodeB or eNodeB functionality is then comprised in the network nodes 101, 140.

Furthermore, it is to be noted that the network 150 of nodes 101, 140 may also or alternatively be realized by more general purpose signal and data processing entities that are implemented more or less entirely by way of software modules that operate in a so-called cloud environment.

As mentioned, the wireless communication device 106 (as well as any number of other wireless communication devices that are not shown in FIG. 1) may operate according to the methods described in this disclosure where RRC connections are set up. Before describing details that are specific to this disclosure, a summary of how an RRC connection may be established will be described with reference to FIG. 2 (and with continued reference to FIG. 1).

Figure 2:
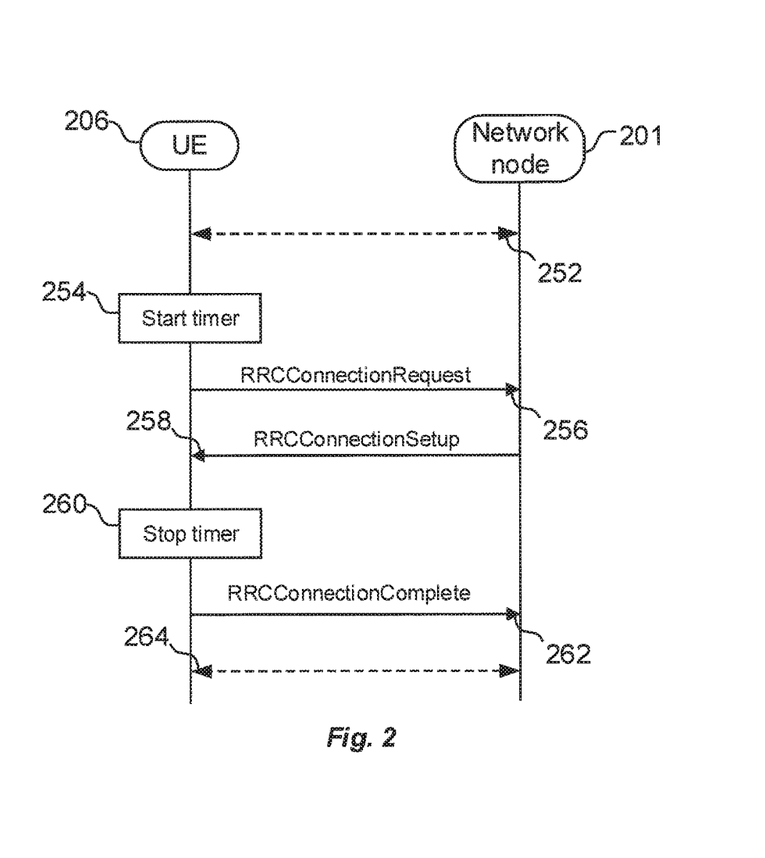
FIG. 2 is a combined signaling diagram and a flowchart.

In FIG. 2, a wireless communication device 206, which may correspond to the wireless communication device 106 in FIG. 1, communicates with a network node 201, which may be any of the entities 110, 120, 130, 101, 140 described above in connection with FIG. 1. However, in a LTE context, the network node 201 will typically be in the form of an eNodeB.

As illustrated by signals 252, the wireless communication device 206 and the network node 201 may be associated with each other prior to the RRC connection setup. For example, the wireless communication device 206 may have been triggered to initiate the RRC connection setup by, e.g., detecting a paging message broadcasted by the network node 201 or detecting user input that indicates a desire to obtain a voice or data connection with another entity (not shown) in the network 100. Having been triggered, the wireless communication device 206 and the network node 201 typically perform a so-called random access procedure, the signalling exchange of which is included in the signals denoted by reference numeral 252. However, reference numeral 252 may also illustrate any data or signal exchange that takes place prior to the methods to be described below.

As indicated by an action 254, after being triggered to initiate the RRC connection and the random access process has been performed, a timer is started by the wireless communication device 206. Following, or concurrently with, the timer start in action 254, the wireless communication device 206 transmits an RRCConnectionRequest message 256, which is received by the network node 201.

The network node 201 processes the RRCConnectionRequest message 256 and, if it finds that the wireless communication device 201 is to be allowed in an RRC connection, the network node 201 transmits an RRCConnectionSetup message 258 to the wireless communication device 206.

Having received the RRCConnectionSetup message 258, the wireless communication device 206 realizes that the RRC connection is allowed and, as a consequence of this, stops the timer in action 260 and transmits an RRCConnectionComplete message 262 to the network node 201, thereby confirming that the RRC connection has been set up.

Further communication involving exchanges of signals and/or data between the wireless communication device 206 and the network node 201 is indicated with reference numeral 264.

Figure 3A:
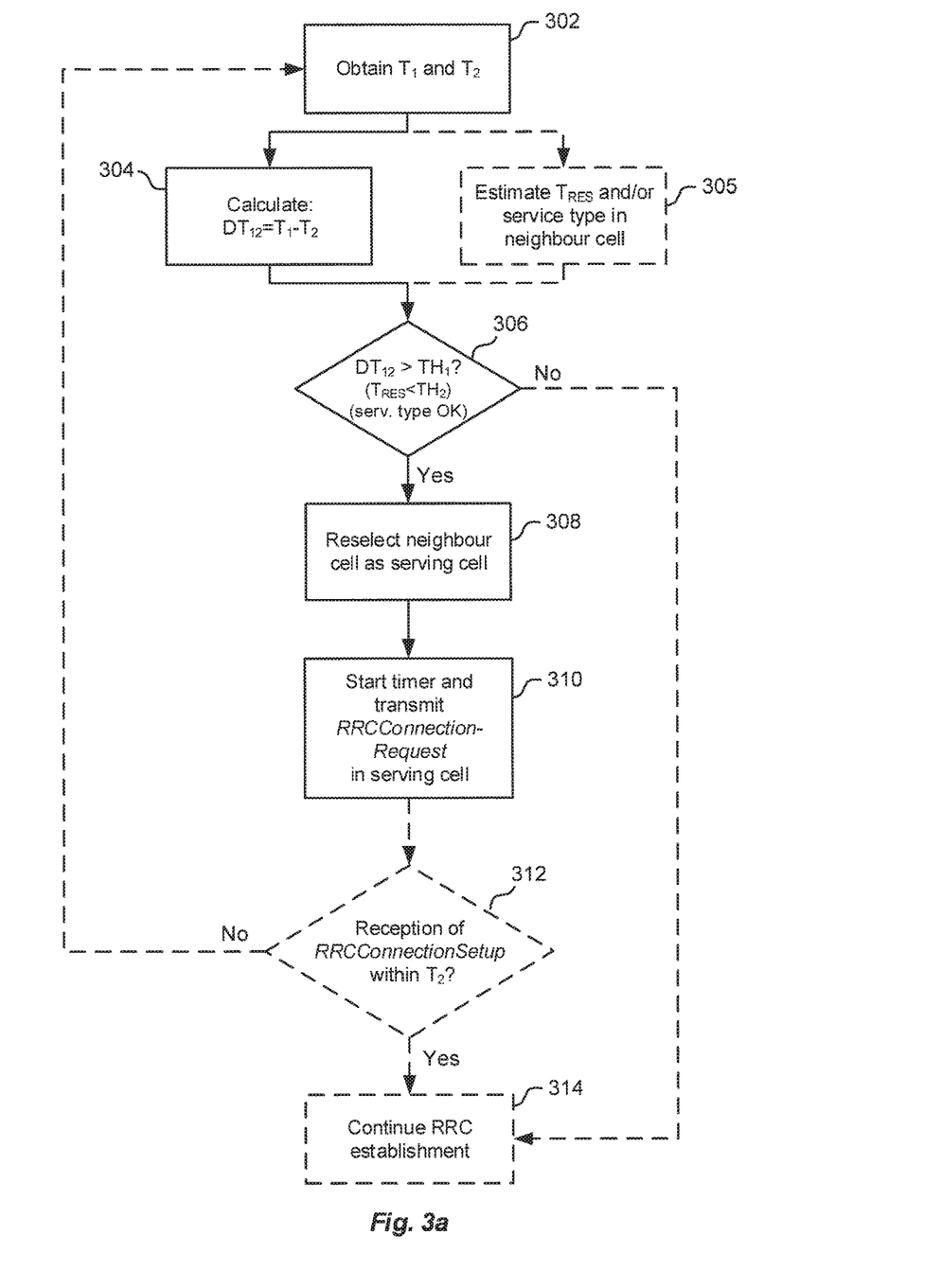

Turning now to FIG. 3a, and with continued reference to FIGS. 1 and 2, embodiments of a method for controlling setup of an RRC connection will be described in some detail. The method is performed by a wireless communication device that may correspond to the wireless communication device 106. The method takes place in a cellular wireless network such as the network 100. The wireless communication device is associated with a serving cell. The serving cell may correspond to cell 131 and the association by the wireless communication device with the serving cell may then, e.g., be such that radio frequency circuitry in the wireless communication device is tuned to a carrier provided by the network node 130. Reference will be made to a neighbour cell. In FIG. 1, such a neighbour cell may be the cell 122 that is maintained by network node 120. Needless to say, both serving cell and neighbour cell may be maintained by one single network node, as the skilled person will realize. Moreover, reference will be made to the wireless communication device "transmitting in the serving cell", which is to be understood as transmitting to a receiving entity that provides functionality of, e.g., a NodeB or eNodeB.

The method illustrated in FIG. 3 will now be described with reference to a number of actions that are performed by the wireless communication device 106.

Action 302

A first timer value $T_1$ and a second timer value $T_2$ are obtained. $T_1$ specifies a maximum time for waiting for an RRC connection setup message from the serving cell 131 and $T_2$ specifies a maximum time for waiting for an RRC connection setup message from a neighbour cell 122.

Action 304

A timer value difference $DT_{12}$ is calculated by subtracting the second timer value $T_2$ from the first timer value $T_1$.

Action 306

A decision is made such that, if the timer value difference $DT_{12}$ is greater than a first threshold value $TH_1$, then the method continues with actions 308 and 310.

As illustrated, if the timer value difference $DT_{12}$ is not greater than $TH_1$, then the method may continue with action 314.

Action 308

If it was found, in action 306, that $DT_{12}$ is greater than $TH_1$, then the neighbour cell 122 is selected as serving cell. That is, the cell that prior to this action was the neighbour cell 122 becomes, as of this action, the serving cell.

Action 310

Also, if it was found, in action 306, that $DT_{12}$ is greater than $TH_1$, then an RRC connection request message is transmitted in the serving cell, i.e. the cell previously denoted neighbouring cell that was reselected as serving cell in action 308. Also, together with the transmission of the RRC connection request message, a timer is started that has the value corresponding to the value of $T_2$. For example, in an LTE system such a timer is started prior to the transmission and in a UMTS system such a timer is started subsequent to the transmission.

Further embodiments of the method that is defined by the actions 302, 304, 306, 308 and 310 described above may include further actions as follows.

Action 305

In some embodiments an estimate may be done of a reselection time, $T_{RES}$. This reselection time may then correspond to a time period needed for executing the reselection that is performed in action 308. In such embodiments, the reselection and transmitting actions in actions 308 and 310 are further conditioned on $T_{RES}$. That is the actions 308 and 310 are performed if the estimated reselection time is less than a second threshold value, $TH_2$. In some of these embodiments, the second threshold value may be equal to the timer value difference, $DT_{12}$.

The reselection time may differ depending on if the cells involved (here the serving and the neighbor cells) are on same or different frequency or whether the cells belong to one and the same radio access technology (RAT) or not. In fact, as realized by the use of the second threshold value, if the reselection time is close to the estimated gain in response $time_1$ it may not be any gain in total time to perform the reselection.

It is to be noted that the reselection process itself may involve a number of steps. Depending on which RAT the wireless communication device is operating, and depending on which RAT the wireless communication device is to continue operating in, the cell reselection may involve various considerations and steps as specified in the 3GPP specifications that describe cell reselection (for example section 5.2 in TS 36.304 and TS 25.304 for LTE and UMTS, respectively).

Furthermore, this action 305 may also or alternatively comprise making an estimate of a type of service provided by the neighbour cell. In such embodiments, the reselection and transmitting actions in actions 308 and 310 are further conditioned, in action 306, on whether this estimated type of service is satisfactory. For example, the type of service a wireless communication device can determine from a cell is mainly based on the type of radio access technology of the cell. From a UMTS, i.e. wideband code division multiple access (WCDMA), cell the wireless communication device may expect circuit switched voice and packet switched data up to a certain data rate. From an LTE cell the wireless communication device may expect voice over internet protocol (VoIP) and higher packet service data rates. The max data rate also depends on the 3GPP standard specification release the network supports. From previous connection with a certain cell, the wireless communication device may "remember" the max data rate achieved. Here it is to be noted that, in case so called access class barring information is read from system information broadcasted in a cell, then, depending on the access class of the wireless communication device, it may be barred from accessing the cell or from accessing the cell for certain types of services.

Action 312

In some embodiments, a check is made with regard to the timer that was started in action 310. That is, if no response to the transmitted RRC connection request message in action 310 is received within a time period corresponding to the second timer value, then the method is repeated from the obtaining of the first and second timer values in action 302.

Action 314

If, as checked in action 312, a response to the transmitted RRC connection request message in action 310 is received within the time period corresponding to the second timer value, then the wireless communication device 106 will continue with RRC connection setup. Details regarding this continuation is outside the scope of the present disclosure.

Figure 3B:
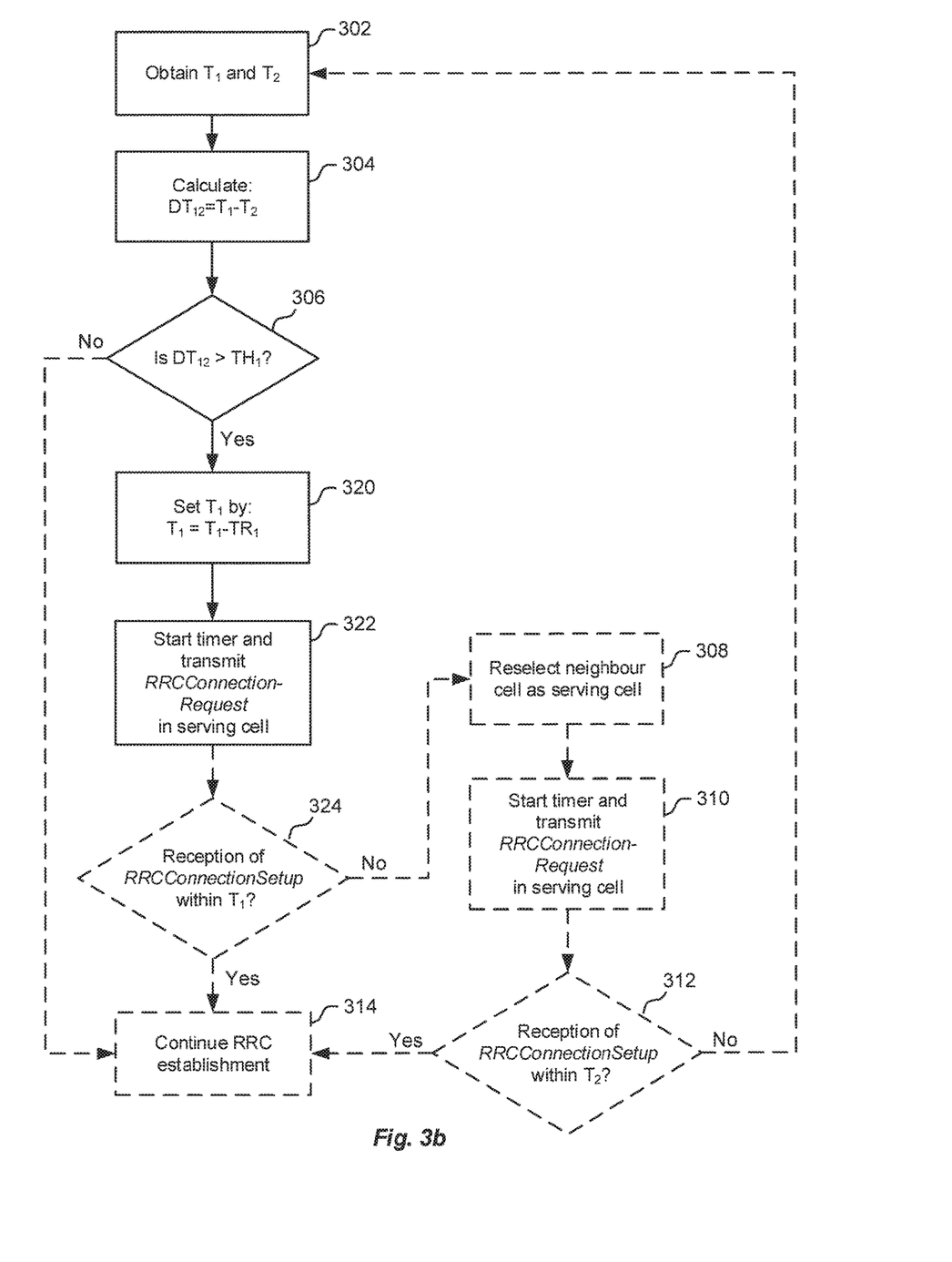

Turning now to FIG. 3b, further embodiments of a method for controlling setup of an RRC connection will be described in some detail. As for the embodiments described above in connection with FIG. 3a, the method in FIG. 3b is performed by a wireless communication device that may correspond to the wireless communication device 106. Furthermore, as in the embodiments of FIG. 3a, obtaining first and second timer values $T_1$ and $T_2$, calculation of a timer value difference $DT_{12}$ and deciding whether the timer value difference $DT_{12}$ is greater than a first threshold value $TH_1$ take place in actions 302, 304 and 306 as described above. However, alternative to the embodiments of FIG. 3a, an outcome of the decision in action 306 is a continued method flow as follows.

Action 320

If it was found, in action 306, that $DT_{12}$ is greater than $TH_1$, then the first timer value is set by subtracting a timer reduction value, $TR_1$, from the first timer value. That is, the first timer value is shortened by the value of $TR_1$ to a shorter time interval.

For example, in some embodiments, the timer reduction value $TR_1$ may be equal to the timer value difference $DT_{12}$.

Action 322

Also, if it was found, in action 306, that $DT_{12}$ is greater than $TH_1$, then an RRC connection request message is transmitted in the serving cell. That is, as an alternative to the action 310, transmission talks place in without prior reselection. Also, as in the embodiments described above, together with the transmission of the RRC connection request message, a timer is started that has the value corresponding to the value of $T_2$. For example, in an LTE system such a timer is started prior to the transmission and in a UMTS system such a timer is started subsequent to the transmission.

Action 324

In some embodiments, a check is made with regard to the timer that was started in action 322. That is, if no response to the transmitted RRC connection request message in action 322 is received within a time period corresponding to the (shortened) first timer value, then the method reverts to the scenario that is described above in connection with FIG. 3a wherein the neighbouring cell is reselected as the serving cell (action 308), the timer is started, the RRC connection request message is transmitted (action 310) and the check (action 312) whether a response is received within $T_2$.

Action 314

If, as checked in action 324, a response to the transmitted RRC connection request message in action 322 is received within the time period corresponding to the (shortened) first timer value, then the wireless communication device 106 will continue with RRC connection setup. Details regarding this continuation is outside the scope of the present disclosure.

Any of the embodiments described above in connection with FIG. 3a and FIG. 3b may comprise further embodiments wherein the obtaining of any of the first timer value and the second timer value comprises receiving information contained in a system information block, SIB, transmitted in the cellular wireless network 100.

Also, any embodiments described above may comprise further embodiments wherein the obtaining of any of the first timer value and the second timer value comprises receiving information contained in a data block transmitted during a data connection in the cellular wireless network.

In such embodiments, any of the first and second timer values received in information contained in a data block transmitted during a data connection may have a value that is lower than a corresponding timer value received in information contained in a SIB. In other words, instead of obtaining timer values in the standard 3GPP manner, i.e. reading the timer values from SIBs, the network may provide a data base containing timer values for cells in the area the wireless communication device is currently located. Such timer data could be obtained by the wireless communication device in a previous data connection with the network, i.e. prior to the RRC connection procedures described above. For example in an exchange of information as exemplified by reference numeral 252 in FIG. 2 Moreover, such timer data may be specific to a wireless communication device in such a way that, e.g., that a wireless communication device with a high expected quality of service requirement could be associated with a shorter timer value than the maximum timer value indicated in system information transmitted in SIBs. Such a scenario has an additional advantage in that time is saved by the fact that it may not even be necessary to read this particular system information from neighboring cells. Such timer data obtained via a previous data connection may, e.g., be read just prior to the wireless communication device going into an idle state, since once idle the data will not be updated until the next connection establishment, which is when the data is to be used (noting that, if the SIBs are changed the wireless communication device will be paged and the SIBs will be re-read while in the idle state).

Figure 4A:
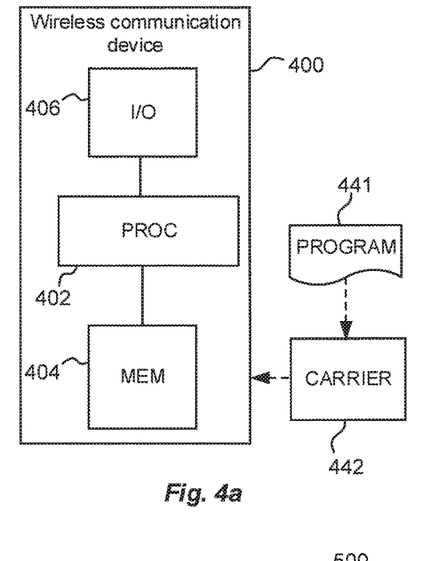

Turning now to FIG. 4a, and with continued reference to FIGS. 1 to 3, a wireless communication device 400 will be described in some detail. The wireless communication device 400 may correspond to any of the wireless communication devices 106, 206 discussed above. The wireless communication device 400 is for controlling setup of a RRC connection in a cellular wireless network such as the network 100 in FIG. 1. The wireless communication device 400 comprises input/output circuitry 406, a processor 402 and a memory 404. The memory 404 contains instructions executable by the processor 402 whereby the wireless communication device 400 is operative to be associated with a serving cell 131 and operative to:

obtain a first timer value, $T_1$, that specifies a maximum time for waiting for an RRC connection setup message from the serving cell and a second timer value, $T_2$, that specifies a maximum time for waiting for an RRC connection setup message from a neighbour cell 121, 122, calculate a timer value difference, $DT_{12}$, by subtracting the second timer value from the first timer value, if the timer value difference is greater than a first threshold value, $TH_1$:

reselect the neighbour cell 121, 122 as serving cell, and transmit an RRC connection request message in the serving cell.

The instructions that are executable by the processor 402 may be software in the form of a computer program 441. The computer program 441 may be contained in or by a carrier 442, which may provide the computer program 441 to the memory 404 and processor 402. The carrier 442 may be in any suitable form including an electronic signal, an optical signal, a radio signal or a computer readable storage medium.

In some embodiments, the wireless communication device 400 is further operative to estimate a reselection time, $T_{RES}$, said reselection time corresponding to a time period needed for executing said reselection, and operative such that said reselection and transmitting are performed if said estimated reselection time is less than a second threshold value, $TH_2$.

In some embodiments, the wireless communication device 400 is operative such that said second threshold value is equal to the timer value difference, $DT_{12}$.

In some embodiments, the wireless communication device 400 is further operative to estimate a type of service provided by the neighbour cell, and operative such that said reselection and transmitting are performed if said estimated type of service is satisfactory..

In some embodiments, the wireless communication device 400 is operative to:

if no response to the transmitted RRC connection request message is received within a time period corresponding to the second timer value, then repeating the method from the obtaining of the first and second timer values.

Figure 4B:
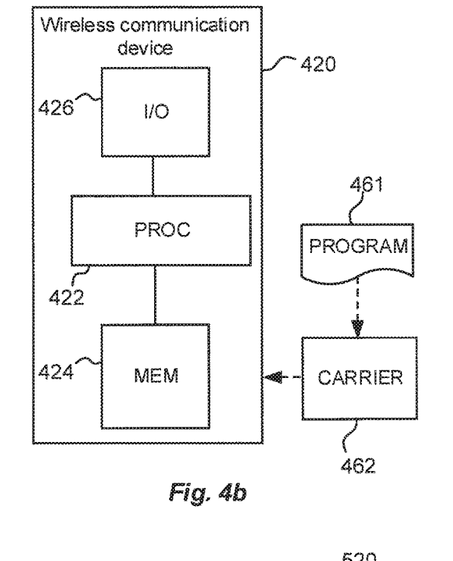

Turning now to FIG. 4b, and with continued reference to FIGS. 1 to 3, a wireless communication device 420 will be described in some detail. The wireless communication device 420 may correspond to any of the wireless communication devices 106, 206 discussed above. The wireless communication device 420 is for controlling setup of a RRC connection in a cellular wireless network such as the network 100 in FIG. 1. The wireless communication device 420 comprises input/output circuitry 426, a processor 422 and a memory 424. The memory 424 contains instructions executable by the processor 422 whereby the wireless communication device 420 is operative to be associated with a serving cell 131 and operative to:

obtain a first timer value, $T_1$, that specifies a maximum time for waiting for an RRC connection setup message from the serving cell and a second timer value, $T_2$, that specifies a maximum time for waiting for an RRC connection setup message from a neighbour cell 121, 122, calculate a timer value difference, $DT_{12}$, by subtracting the second timer value from the first timer value, if the timer value difference is greater than a first threshold value, $TH_1$:

set the first timer value by subtracting a timer reduction value, $TR_1$, from the first timer value, and transmit an RRC connection request message in the serving cell.

The instructions that are executable by the processor 422 may be software in the form of a computer program 461. The computer program 461 may be contained in or by a carrier 462, which may provide the computer program 461 to the memory 424 and processor 422. The carrier 462 may be in any suitable form including an electronic signal, an optical signal, a radio signal or a computer readable storage medium.

In some embodiments, the wireless communication device 420 is operative such that the timer reduction value, TR1, is equal to the timer value difference, DT12.

In some embodiments, the wireless communication device 420 is operative to:

if no response to the transmitted RRC connection request message is received within a time period corresponding to the first timer value, then:

reselect the neighbour cell as serving cell, and transmit an RRC connection request message in the serving cell.

In some embodiments, the wireless communication device 420 is operative such that the obtaining of any of the first timer value and the second timer value comprises receiving information contained in a system information block, SIB, transmitted in the cellular wireless network.

In some embodiments, the wireless communication device 420 is operative such that the obtaining of any of the first timer value and the second timer value comprises receiving information contained in a data block transmitted during a data connection in the cellular wireless network.

In some embodiments, the wireless communication device 420 is operative such that any of the first and second timer values received in information contained in a data block transmitted during a data connection has a value that is lower than a corresponding timer value received in information contained in a SIB.

Figure 5A:
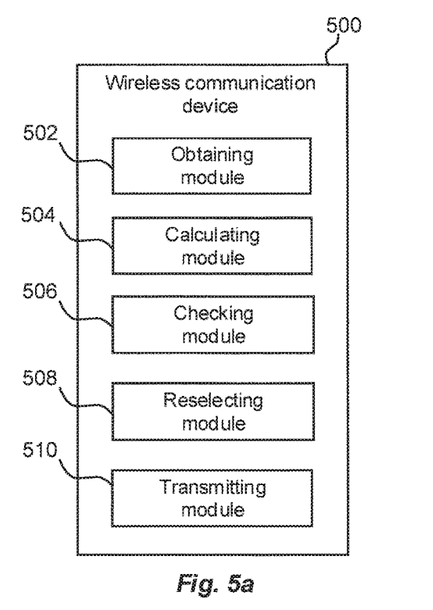

FIG. 5a schematically illustrates a wireless communication device 500 that comprises:
- an obtaining module 502 that is configured to obtain a first timer value, $T_1$, that specifies a maximum time for waiting for an RRC connection setup message from the serving cell and a second timer value, $T_2$, that specifies a maximum time for waiting for an RRC connection setup message from a neighbour cell (121, 122),
- a calculating module 504 that is configured to calculate a timer value difference, $DT_{12}$, by subtracting the second timer value from the first timer value,
- a checking module 506 that is configured to check if the timer value difference is greater than a first threshold value, $TH_1$,
  - a reselecting module 508 that is configured to reselect the neighbour cell as serving cell, and
  - a transmitting module 510 that is configured to transmit an RRC connection request message in the serving cell.

The wireless communication device 500 may comprise further modules that are configured to perform in a similar manner as, e.g., the wireless communication device 400 described above in connection with FIG. 4a.

Figure 5B:
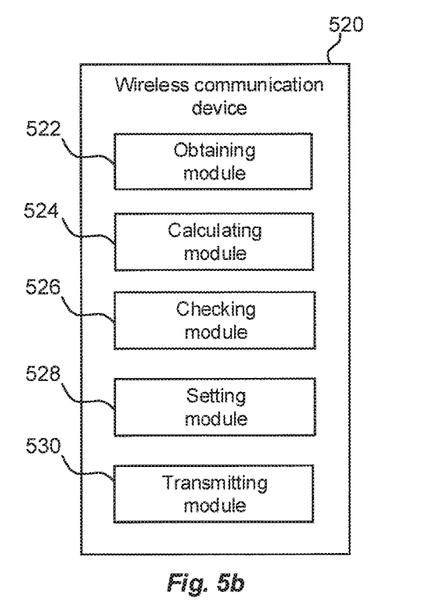

FIG. 5b schematically illustrates a wireless communication device 520 that comprises:
- an obtaining module 522 that is configured to obtain a first timer value, $T_1$, that specifies a maximum time for waiting for an RRC connection setup message from the serving cell and a second timer value, $T_2$, that specifies a maximum time for waiting for an RRC connection setup message from a neighbour cell (121, 122),
- a calculating module 524 that is configured to calculate a timer value difference, $DT_{12}$, by subtracting the second timer value from the first timer value,
- a checking module 526 that is configured to check if the timer value difference is greater than a first threshold value, $TH_1$,
  - a setting module 528 that is configured to set the first timer value by subtracting a timer reduction value, $TR_1$, from the first timer value, and
  - a transmitting module 530 that is configured to transmit an RRC connection request message in the serving cell.

The wireless communication device 520 may comprise further modules that are configured to perform in a similar manner as, e.g., the wireless communication device 420 described above in connection with FIG. 4b.

The invention claimed is:

1. A method performed by a wireless communication device for controlling setup of a radio resource control, RRC, connection in a cellular wireless network, said wireless communication device being associated with a serving cell, the method comprising:
    obtaining a first timer value, $T_1$, that specifies a maximum time for waiting for an RRC connection setup message from the serving cell and a second timer value, $T_2$, that specifies a maximum time for waiting for an RRC connection setup message from a neighbour cell,
    calculating a timer value difference, $DT_{12}$, by subtracting the second timer value from the first timer value,
    if said timer value difference is greater than a first threshold value, $TH_1$:
        reselecting the neighbour cell as serving cell, and
        transmitting an RRC connection request message in the serving cell.

2. The method of claim 1, further comprising estimating a reselection time, $T_{RES}$, said reselection time corresponding to a time period needed for executing said reselection, and wherein said reselection and transmitting are performed if said estimated reselection time is less than a second threshold value, $TH_2$.

3. The method of claim 2, wherein said second threshold value is equal to the timer value difference, $DT_{12}$.

4. The method of claim 1, further comprising estimating a type of service provided by the neighbour cell, and wherein said reselection and transmitting are performed if said estimated type of service is satisfactory.

5. The method of claim 1, comprising:
    if no response to the transmitted RRC connection request message is received within a time period corresponding to the second timer value, then repeating the method from the obtaining of the first and second timer values.

6. A method performed by a wireless communication device for controlling setup of a radio resource control, RRC, connection in a cellular wireless network, said wireless communication device being associated with a serving cell, the method comprising:
    obtaining a first timer value, $T_1$, that specifies a maximum time for waiting for an RRC connection setup message from the serving cell and a second timer value, $T_2$, that specifies a maximum time for waiting for an RRC connection setup message from a neighbour cell,
    calculating a timer value difference, $DT_{12}$, by subtracting the second timer value from the first timer value,
    if the timer value difference is greater than a first threshold value, $TH_1$:
        setting the first timer value by subtracting a timer reduction value, $TR_1$, from the first timer value, and
        transmitting an RRC connection request message in the serving cell.

7. The method of claim 6, wherein the timer reduction value, $TR_1$, is equal to the timer value difference, $DT_{12}$.

8. The method of claim 6, comprising:
    if no response to the transmitted RRC connection request message is received within a time period corresponding to the first timer value, then:
        reselecting the neighbour cell as serving cell, and
        transmitting an RRC connection request message in the serving cell.

9. The method of claim 1, wherein the obtaining of any of the first timer value and the second timer value comprises receiving information contained in a system information block, SIB, transmitted in the cellular wireless network.

10. The method of claim 1, wherein the obtaining of any of the first timer value and the second timer value comprises receiving information contained in a data block transmitted during a data connection in the cellular wireless network.

11. The method of claim 9,
    wherein the obtaining of any of the first timer value and the second timer value comprises receiving information contained in a data block transmitted during a data connection in the cellular wireless network, and
    wherein any of the first and second timer values received in information contained in a data block transmitted during a data connection has a value that is lower than a corresponding timer value received in information contained in a SIB.

12. A wireless communication device for controlling setup of a radio resource control, RRC, connection in a cellular wireless network, said wireless communication device comprising input/output circuitry, a processor and a memory, said memory containing instructions executable by said processor whereby the wireless communication device is operative to be associated with a serving cell and operative to:
obtain a first timer value, $T_1$, that specifies a maximum time for waiting for an RRC connection setup message from the serving cell and a second timer value, $T_2$, that specifies a maximum time for waiting for an RRC connection setup message from a neighbour cell,
calculate a timer value difference, $DT_{12}$, by subtracting the second timer value from the first timer value,
if the timer value difference is greater than a first threshold value, $TH_1$:
reselect the neighbour cell as serving cell, and
transmit an RRC connection request message in the serving cell.

13. The wireless communication device of claim 12, further operative to estimate a reselection time, $T_{RES}$, said reselection time corresponding to a time period needed for executing said reselection, and operative such that said reselection and transmitting are performed if said estimated reselection time is less than a second threshold value, $TH_2$.

14. The wireless communication device of claim 13, operative such that said second threshold value is equal to the timer value difference, $DT_{12}$.

15. The wireless communication device of claim 12, further operative to estimate a type of service provided by the neighbour cell, and operative such that said reselection and transmitting are performed if said estimated type of service is satisfactory.

16. The wireless communication device of claim 12, operative to:
if no response to the transmitted RRC connection request message is received within a time period corresponding to the second timer value, then repeating the method from the obtaining of the first and second timer values.

17. A wireless communication device for controlling setup of a radio resource control, RRC, connection in a cellular wireless network, said wireless communication device comprising input/output circuitry, a processor and a memory, said memory containing instructions executable by said processor whereby the wireless communication device is operative to be associated with a serving cell and operative to:
obtain a first timer value, $T_1$, that specifies a maximum time for waiting for an RRC connection setup message from the serving cell and a second timer value, $T_2$, that specifies a maximum time for waiting for an RRC connection setup message from a neighbour cell,
calculate a timer value difference, $DT_{12}$, by subtracting the second timer value from the first timer value,
if the timer value difference is greater than a first threshold value, $TH_1$:
set the first timer value by subtracting a timer reduction value, $TR_1$, from the first timer value, and
transmit an RRC connection request message in the serving cell.

18. The wireless communication device of claim 17, operative such that the timer reduction value, $TR_1$, is equal to the timer value difference, $DT_{12}$.

19. The wireless communication device of claim 17, operative to:
if no response to the transmitted RRC connection request message is received within a time period corresponding to the first timer value, then:
reselect the neighbour cell as serving cell, and
transmit an RRC connection request message in the serving cell.

20. The wireless communication device of claim 12, operative such that the obtaining of any of the first timer value and the second timer value comprises receiving information contained in a system information block, SIB, transmitted in the cellular wireless network.

21. The wireless communication device of claim 12, operative such that the obtaining of any of the first timer value and the second timer value comprises receiving information contained in a data block transmitted during a data connection in the cellular wireless network.

22. The wireless communication device of claim 20,
operative such that the obtaining of any of the first timer value and the second timer value comprises receiving information contained in a data block transmitted during a data connection in the cellular wireless network, and
operative such that any of the first and second timer values received in information contained in a data block transmitted during a data connection has a value that is lower than a corresponding timer value received in information contained in a SIB.

23. A nontransitory computer readable storage medium comprising a computer program comprising instructions which, when executed on at least one processor in a wireless communication device, cause the wireless communication device to carry out a method for controlling setup of a radio resource control, RRC, connection in a cellular wireless network, said wireless communication device being associated with a serving cell, the method comprising:
obtaining a first timer value, $T_1$, that specifies a maximum time for waiting for an RRC connection setup message from the serving cell and a second timer value, $T_2$, that specifies a maximum time for waiting for an RRC connection setup message from a neighbour cell,
calculating a timer value difference, $DT_{12}$, by subtracting the second timer value from the first timer value,
if said timer value difference is greater than a first threshold value, $TH_1$:
reselecting the neighbour cell as serving cell, and
transmitting an RRC connection request message in the serving cell.

* * * * *

UNITED STATES PATENT AND TRADEMARK OFFICE
CERTIFICATE OF CORRECTION

PATENT NO. : 10,149,332 B2
APPLICATION NO. : 15/109641
DATED : December 4, 2018
INVENTOR(S) : Joachim Ramkull It is certified that error appears in the above-identified patent and that said Letters Patent is hereby corrected as shown below:

In the Specification

In Column 7, Line 9, delete "$time_1$" and insert -- time, --, therefor.

Signed and Sealed this
Fifteenth Day of September, 2020

Andrei Iancu
*Director of the United States Patent and Trademark Office*